(12) United States Patent
Chiang et al.

(10) Patent No.: US 9,419,469 B2
(45) Date of Patent: Aug. 16, 2016

(54) HIGH EFFICIENCY WIRELESS CHARGING SYSTEM AND ITS CONTROL METHOD

(71) Applicant: AUTOMOTIVE RESEARCH & TESTING CENTER, Lugang Chen, Changhua Hsien (TW)

(72) Inventors: Chao-Wen Chiang, Changhua Hsien (TW); Chou-Yu Hsieh, Changhua Hsien (TW)

(73) Assignee: AUTOMOTIVE RESEARCH & TESTING CENTER, Lugang Chen, Changhua Hsien (TW)

( * ) Notice: Subject to any disclaimer, the term of this patent is extended or adjusted under 35 U.S.C. 154(b) by 434 days.

(21) Appl. No.: 14/138,357

(22) Filed: Dec. 23, 2013

(65) Prior Publication Data

US 2015/0180265 A1 Jun. 25, 2015

(51) Int. Cl.
*H02J 7/00* (2006.01)
*H02J 7/02* (2016.01)

(52) U.S. Cl.
CPC ............... *H02J 7/025* (2013.01); *H02J 7/007* (2013.01); *H02J 7/0052* (2013.01)

(58) Field of Classification Search
CPC .......... H02J 7/0052; H02J 7/007; H02J 7/025
USPC .................................................. 320/108, 137
See application file for complete search history.

(56) References Cited

U.S. PATENT DOCUMENTS

| | | | | |
|---|---|---|---|---|
| 6,972,543 B1* | 12/2005 | Wells | ...................... | H02J 7/025 320/108 |
| 2009/0284227 A1* | 11/2009 | Mohammadian | ..... | G06K 7/0008 320/137 |
| 2012/0286582 A1 | 11/2012 | Kim et al. | | |
| 2013/0033117 A1 | 2/2013 | Kim et al. | | |
| 2013/0307468 A1* | 11/2013 | Lee | ...................... | H02J 7/0052 320/108 |

FOREIGN PATENT DOCUMENTS

| | | | |
|---|---|---|---|
| TW | 201001869 A1 | 1/2010 | |
| TW | 201106572 A1 | 2/2011 | |

* cited by examiner

*Primary Examiner* — Nathaniel Pelton
(74) *Attorney, Agent, or Firm* — patenttm.us

(57) ABSTRACT

A control method for a wireless charging system has steps of performing impedance matching on an antenna of the wireless charging system; tracing an optimal frequency point by sending a sensing signal with a default transmission frequency, and calculating a transmission efficiency of the sensing signal; determining whether the transmission efficiency meets a transmission requirement. When the transmission efficiency does not meet the transmission requirement, repeats the previous steps with another default transmission frequency until the transmission efficiency meeting the transmission requirement. When the transmission efficiency meeting the transmission requirement, the default transmission frequency is defined as the optimal frequency point for charging. Setting the optimal frequency point as an operating frequency of the wireless charging system for charging The optimal frequency point defined by the above steps can maintain high efficiency of the wireless charging system against the variable transmitting distances.

13 Claims, 12 Drawing Sheets

PIROR ART

PIROR ART

PIROR ART

HIGH EFFICIENCY WIRELESS CHARGING SYSTEM AND ITS CONTROL METHOD

BACKGROUND OF THE INVENTION

1. Field of the Invention

The present invention relates to a wireless charging system and its control method and more particularly to a high efficiency wireless charging system and its control method.

2. Description of Related Art

Wireless charging is also known as contactless charging. A wireless charger transmits power to a charged device by inductive coupling, wherein a battery of the charged device is wirelessly charged by the transmitted power. Therefore, cable connections are not required during wireless charging, such that, wireless charging is safer, more durable and more convenient than conventional cable charging.

When a transmission distance between the wireless charger and the charged device exceeds an effective transmission distance of normal inductive coupling, the wireless charger has to transmit the power by resonant inductive coupling to increase the effective transmission distance of wireless charging. The wireless charger and the charged device have to be operated in same operating frequency range.

With reference to FIG. 10, a vertical axis indicates transmission efficiency of a wireless charger, and a horizontal axis indicates operating frequency of the wireless charger. One can obtain that the wireless charger has two resonant frequency points $\omega_1$, $\omega_2$, wherein the two resonant frequency points $\omega_1$, $\omega_2$ are respectively determined based on capacitive elements and inductive elements of a transmitting circuit of the wireless charger. The two resonant frequency points $\omega_1$, $\omega_2$ can be respectively calculated according to two formulas:

$$\omega_1 = \sqrt{\frac{1}{C(L + L_m)}}$$

$$\omega_2 = \sqrt{\frac{1}{C(L - L_m)}},$$

wherein $L_m$ is coupled inductance.

When any one of the two resonant frequency points lies in the operating frequency range of the wireless charger, the resonant frequency point which lies in the operating frequency range of the wireless charger is defined as an optimal frequency point.

However, the optimum frequency point may be beyond the operating frequency range when the transmission distance between the wireless charger and the charged device varies, and decreases the transmission efficiency of the wireless charger.

With reference to FIG. 11, a vertical axis indicates the sending efficiency of the wireless charger, and a horizontal axis indicates the transmission distance between the wireless charger and the charged device. One can obtain that when the transmission distance between the wireless charger and the charged device is 18 cm, the wireless charger has optimal transmission efficiency. When the transmission distance between the wireless charger and the charged device changes from 18 cm, no matter the transmission distance is extended or shortened, the transmission efficiency of the wireless charger is reduced.

Therefore, how to keep the resonant frequency points in the operating frequency range is an important object in wireless charging, wherein impedance matching is usually used for keeping resonant frequency points of a wireless charger in the operating frequency range of the wireless charger. There are two conventional methods for impedance matching:

1. adding an impedance matching circuit to the wireless charger.
2. adjusting parameters of a power amplifier of the wireless charger.

With reference to FIG. 12, an impedance matching circuit 80 is added to a coupling antenna 70 of a wireless charger. The impedance matching circuit 80 has two capacitors $C_S$, $C_P$ and an inductor $L_S$, wherein capacitance values of the two capacitors $C_S$, $C_P$ and an inductance of the inductor $L_S$ are adjustable. By the two above-mentioned formulas, one can obtain that resonant frequency points of the wireless charger change with a variation of the capacitance values of the two capacitors $C_S$, $C_P$ and/or a variation of the inductance of the inductor $L_S$. Therefore, the resonant frequency points can be adjusted to lie in the operating frequency range of the wireless charger by adjusting the capacitance values of the two capacitors $C_S$, $C_P$ and/or the inductance of the inductor $L_S$.

However, adding an impedance matching circuit to the wireless charger has disadvantages of a low matching accuracy, a low matching speed, and even lowering a transmission efficiency of a wireless charger.

Besides, adjusting the parameters of the power amplifier of the wireless charger also has disadvantages of a low matching accuracy and having a complicated calculation.

In conclusion, the conventional methods for keeping optimal frequency points in an operating frequency range of a wireless charger by impedance matching have multiple disadvantages of a low matching accuracy, a low matching speed, and even lowering the transmission efficiency of the wireless charger. Therefore, methods for keeping optimal frequency point have to be improved.

SUMMARY OF THE INVENTION

The main objective of the invention is to provide a high efficiency wireless charging system and its control method.

The control method for the high efficiency wireless charging system comprises steps of:

keeping a resonant frequency point of a wireless charging system in an operating frequency range of the wireless charging system by performing impedance matching on an antenna of the wireless charging system;

tracing an optimal frequency point by sending a sensing signal with a default transmission frequency, and calculating a transmission efficiency of the sensing signal;

determining whether the transmission efficiency meets a transmission requirement; when the transmission efficiency does not meet the transmission requirement, repeats the previous steps with another default transmission frequency until the transmission efficiency meeting the transmission requirement;

when the transmission efficiency meeting the transmission requirement, the default transmission frequency is defined as the optimal frequency point;

setting the optimal frequency point as an operating frequency of the wireless charging system for charging.

Another main objective of the invention is to provide a high efficiency wireless charging system.

The wireless charging system comprises a wireless transmitter and a wireless receiver. The wireless transmitter has a first controller and a transmission circuit. The transmission circuit has a first impedance matching unit and a transmission unit. The first impedance matching unit is connected to the transmission unit, wherein a capacitance of the first impedance matching unit is variable and controlled by the first controller for impedance matching. Then, the first controller further executes a tracing process for an optimal frequency point. The wireless receiver has a second controller and a receiving circuit. The receiving circuit has a receiving unit and a second impedance matching unit. The second impedance matching unit is connected to the receiving unit, wherein a capacitance of the second impedance matching unit is variable and controlled by the second controller for impedance matching. Then, the second controller further executes a tracing process for the optimal frequency point.

The high efficiency wireless charging system in accordance with the present invention and its control method perform impedance matching on an antenna of the wireless charging system to keep a resonant frequency point of the wireless charging system in an operating frequency range of the wireless charging system. Then, a tracing process for an optimal frequency point is executed and a sensing signal with a default signal is sent. After that, determining whether a transmission efficiency of the sensing signal meets a transmission requirement. When the transmission efficiency does not meet the transmission requirement, repeats the previous steps with another default transmission frequency until the transmission efficiency meets the transmission requirement. The default transmission frequency of the sensing signal having a transmission efficiency meeting the transmission requirement is defined as an optimal frequency point of the wireless charging system. The high efficiency wireless charging system in accordance with the present invention and its control method provides a relatively easy method for defining an optimal frequency point of the wireless charging system compared to conventional methods. Furthermore, the optimal frequency point defined by the high efficiency wireless charging system in accordance with the present invention can maintain high efficiency of the wireless charging system against the variable transmitting distances.

DETAILED DESCRIPTION OF THE PREFERRED EMBODIMENTS

Figure 1:
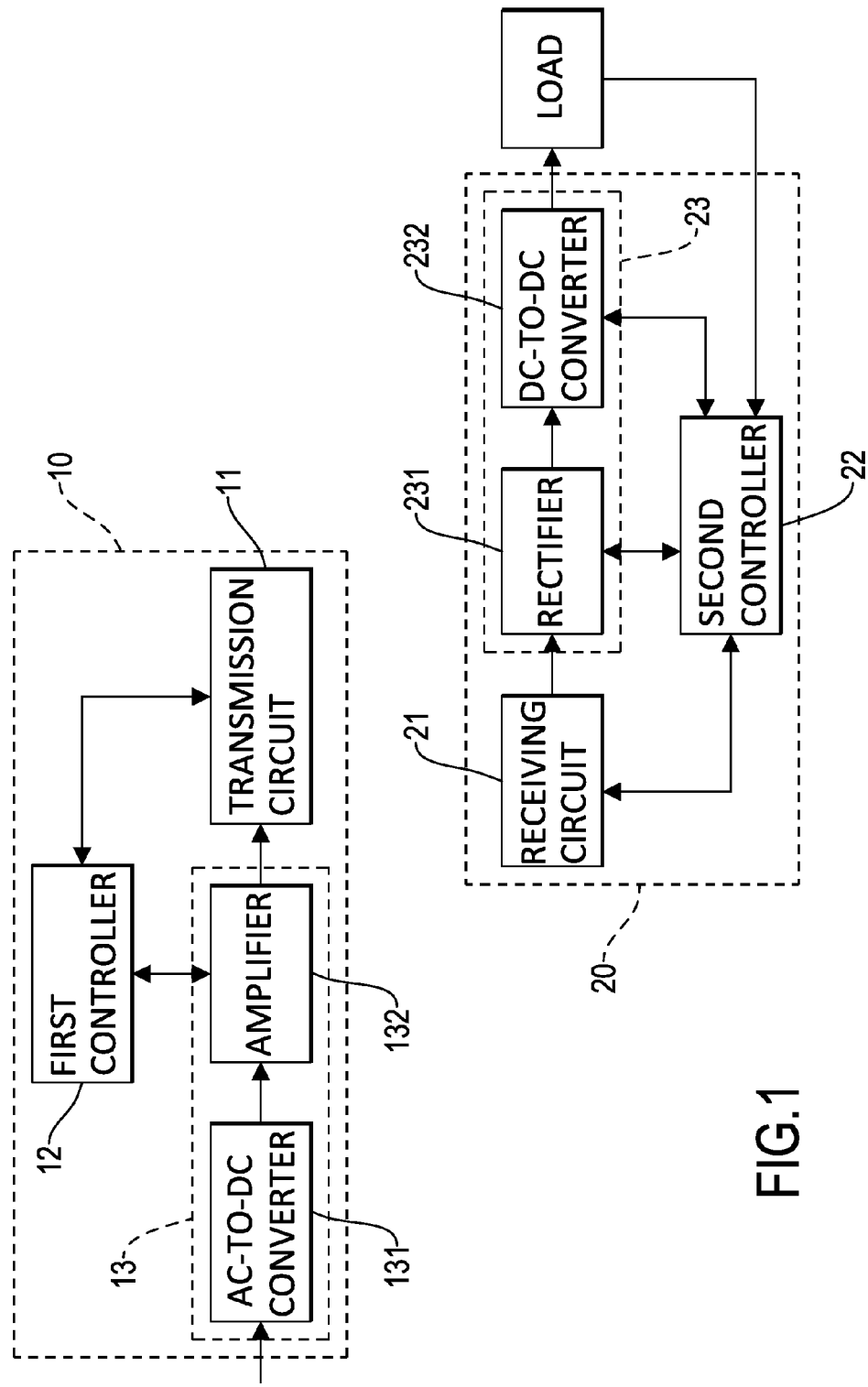
FIG. 1 is a block diagram of a first preferred embodiment of a high efficiency wireless charging system in accordance with the present invention.

With reference to FIG. 1, a first preferred embodiment of a high efficiency wireless charging system in accordance with the present invention comprises a wireless transmitter 10 and a wireless receiver 20.

The wireless transmitter 10 has a transmission circuit 11, a first controller 12 and a first power conversion module 13.

Figure 2:
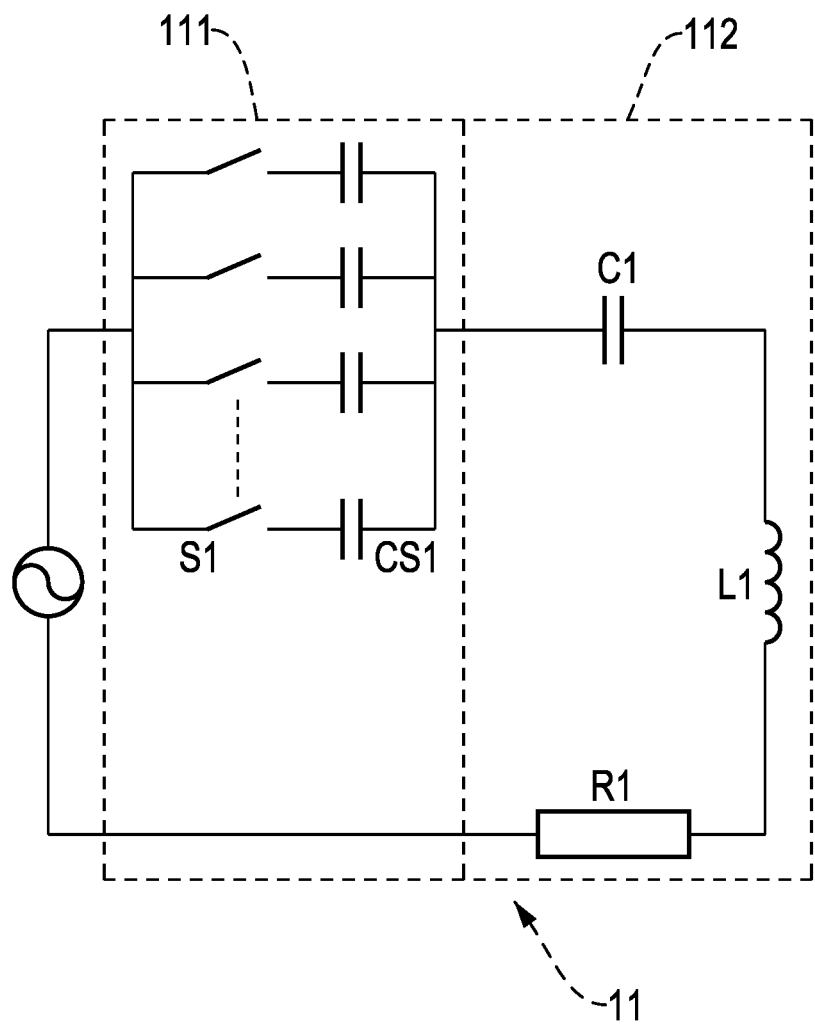
FIG. 2 is a circuit diagram of a transmission circuit of the high efficiency wireless charging system in FIG. 1.

With reference to FIG. 2, the transmission circuit 11 has a first impedance matching unit 111 and a transmission unit 112. The transmission unit 112 has a first fixed capacitor C1, a first induction coil L1 and a first resistor R1, wherein the first fixed capacitor C1, the first induction coil L1 and the first resistor R1 are connected in series or in parallel to form a first circuit loop. In the first preferred embodiment, the first fixed capacitor C1, the first induction coil L1 and the first resistor R1 are connected in series, and the first resistor R1 is an internal resistor. The first impedance matching unit 111 is connected in series or in parallel with the first circuit loop of the transmission unit 112.

The first impedance matching unit 111 may be a variable capacitor which is able to modulate continuously or a capacitor array comprised of multiple regulated capacitors connected in parallel. In the first preferred embodiment, first impedance matching unit 111 is a capacitor array comprised of multiple first regulated capacitors Cs1 connected in parallel, but not limits to this. Each first regulated capacitor Cs1 is connected in series with a first circuit switch S1, wherein a conduction of each first circuit switch Si is controlled by the first controller 12, that is, the first controller 12 controls an amount of the first regulated capacitors Cs1 connected in parallel which joins the first circuit loop of the transmission unit 112, and further controls a capacitance of the first circuit loop of the transmission unit 112.

According to the following two formulas:

$$\omega_1 = \sqrt{\frac{1}{C'(L1+L_m)}}$$

$$\omega_2 = \sqrt{\frac{1}{C'(L1-L_m)}},$$

wherein $L_m$ is coupled inductance generated from the first induction coil L1 coupling, and C'=C1+Cs.

One can obtain that a total capacitance of the transmission unit 112 changes with first regulated capacitors Cs1 of the first impedance matching unit 111 joining the first circuit loop of the transmission unit 112, and further changes resonant frequency points of the transmission circuit 11. The above impedance matching is to keep the resonant frequency points of the transmission circuit 11 in a proper operating frequency range, wherein the operating frequency range has a certain range such as 140.91 KHz to 148.5 KHz, but not limit to this.

In the first preferred embodiment, the first power conversion module 13 is AC-to-DC form, and has an AC-to-DC converter 131 and an amplifier 132. The AC-to-DC converter 131 has an input terminal and an output terminal. The amplifier 132 has an input terminal and an output terminal. The input terminal and the output terminal of the AC-to-DC converter 131 are respectively connected to an AC power and the input terminal of the amplifier 132. The output terminal of the amplifier 132 is connected to an input terminal of the transmission circuit 11.

Figure 3:
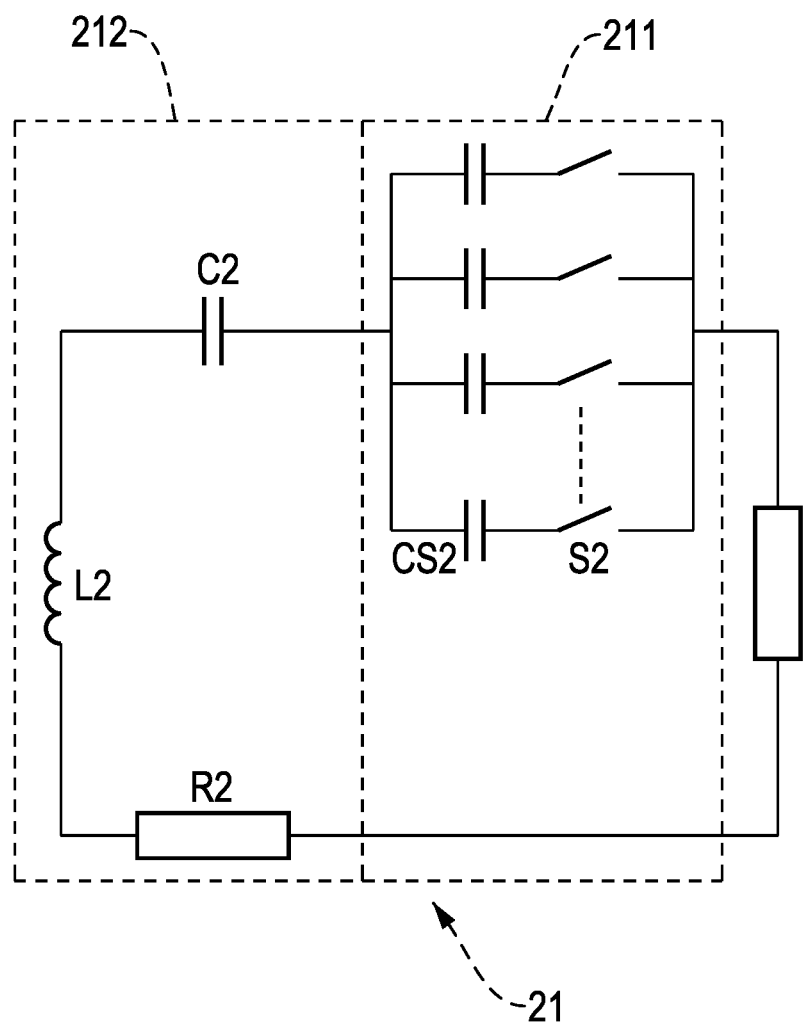
FIG. 3 is a circuit diagram of a receiving circuit of the high efficiency wireless charging system in FIG. 1.

With reference to FIGS. 1 and 3, the wireless receiver 20 has a receiving circuit 21, a second controller 22 and a second power conversion module 23.

With reference to FIG. 3, the receiving circuit 21 has a second impedance matching unit 211 and a receiving unit 212. The receiving unit 212 has a second fixed capacitor C2, a second induction coil L2 and a second resistor R2, wherein the second fixed capacitor C2, the second induction coil L2 and the second resistor R2 are connected in series or in parallel to form a second circuit loop. In the first preferred embodiment, the second fixed capacitor C2, the second induction coil L2 and the second resistor R2 are connected in series, and the second resistor R2 is an internal resistor. The second impedance matching unit 211 is connected in series or in parallel with the second circuit loop of the receiving unit 212.

The second impedance matching unit 211 may be a variable capacitor which is able to modulate continuously or a capacitor array comprised of multiple regulated capacitors connected in parallel. In the first preferred embodiment, second impedance matching unit 211 is a capacitor array comprised of multiple second regulated capacitors Cs2 connected in parallel, but not limits to this. Each second regulated capacitor Cs2 is connected in series with a second circuit switch S2, wherein a conduction of each second circuit switch S2 is controlled by the second controller 12, that is, the second controller 22 controls an amount of the second regulated capacitors Cs2 connected in parallel which joins the second circuit loop of the receiving unit 212, and further controls a capacitance of the second circuit loop of the receiving unit 212.

The wireless transmitter 10 and the wireless receiver 20 have a same resonant structure, thus, the wireless transmitter 10 and the wireless receiver 20 have a same impedance matching method to find same resonant frequency points. Theoretically, the amount of the first regulated capacitors Cs1 of the first impedance matching unit 111 which joins the first circuit loop of the transmission unit 112 equals the amount of the second regulated capacitors Cs2 of the second impedance matching unit 211 which joins the second circuit loop of the receiving unit 212.

In the first preferred embodiment, the second power conversion module 23 is DC-to-DC form, and has a rectifier 231 and a DC-to-DC converter 232.

The above paragraph discloses a structure of the first preferred embodiment of the high efficiency wireless charging system in accordance with the present invention. The first controller 12 of the wireless transmitter 10 and the second controller 22 of the wireless receiver 20 respectively control the first and the second impedance matching unit 111, 211 performing impedance matching on the transmission circuit 112 and the receiving unit 212 respectively. Then, the first and the second controller 12, 22 further execute a tracing process for an optimal frequency point. The impedance matching method and the tracing process for the optimal frequency point of the first and the second controller 12, 22 are disclosure in the following paragraph.

Figure 4:
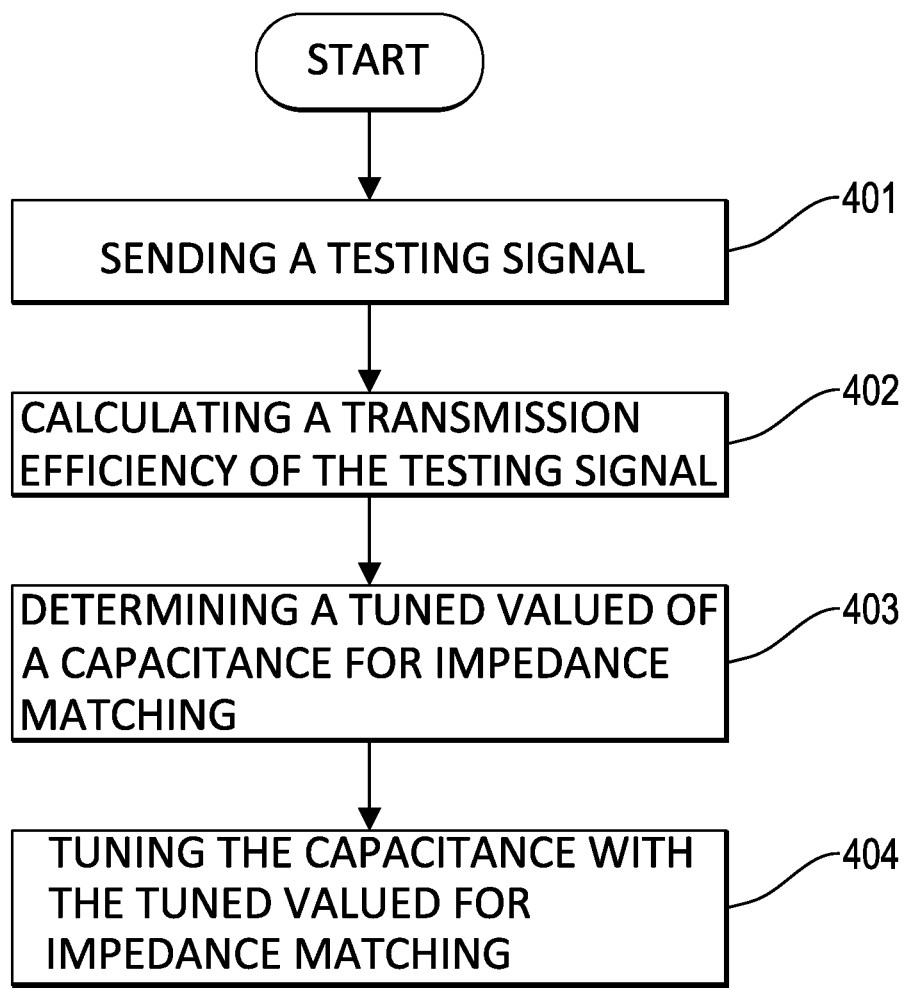
FIG. 4 is a flow chart of an impedance matching method of the high efficiency wireless charging system in FIG. 1.

With reference to FIG. 4, the impedance matching method comprises steps of:

Sending a testing signal (401).

Calculating a transmission efficiency of the testing signal (402).

Determining a tuned value of a capacitance for impedance matching (403).

Tuning the capacitance with the tuned value for impedance matching (404).

In the step (401), the first and the second controller 12, 22 respectively sense currents and voltages of the transmission unit 112 and the receiving unit 212.

In the step (402), the first and the second controller 12, 22 respectively calculate the transmission efficiency of the testing signal based on the currents and the voltages of the transmission unit 112 and the receiving unit 212 sensed in step (401).

In the step (403), the first and the second controller 12, 22 respectively determine the amounts of the first and the second regulated capacitors Cs1, Cs2 which joins the first and the second circuit loops of the transmission unit 112 and the receiving unit 212. In the first preferred embodiment, the first and the second controller 12, 22 further have a comparison table of transmission efficiency to transmission distance respectively, and determine the amounts of the first and the second regulated capacitors Cs1, Cs2 which joins the first and the second circuit loops of the transmission unit 112 and the receiving unit 212 based on the comparison table of transmission efficiency to transmission distance.

In the step (404), the first and the second controller 12, 22 respectively join the first and the second regulated capacitors Cs1, Cs2 to the first and the second circuit loops of the transmission unit 112 and the receiving unit 212 for impedance matching, and further keep the resonant frequency points of the high efficiency wireless system in a proper operating frequency range, wherein the operating frequency range has a certain range such as 140.91 KHz to 148.5 KHz, but not limit to this.

Figure 5:
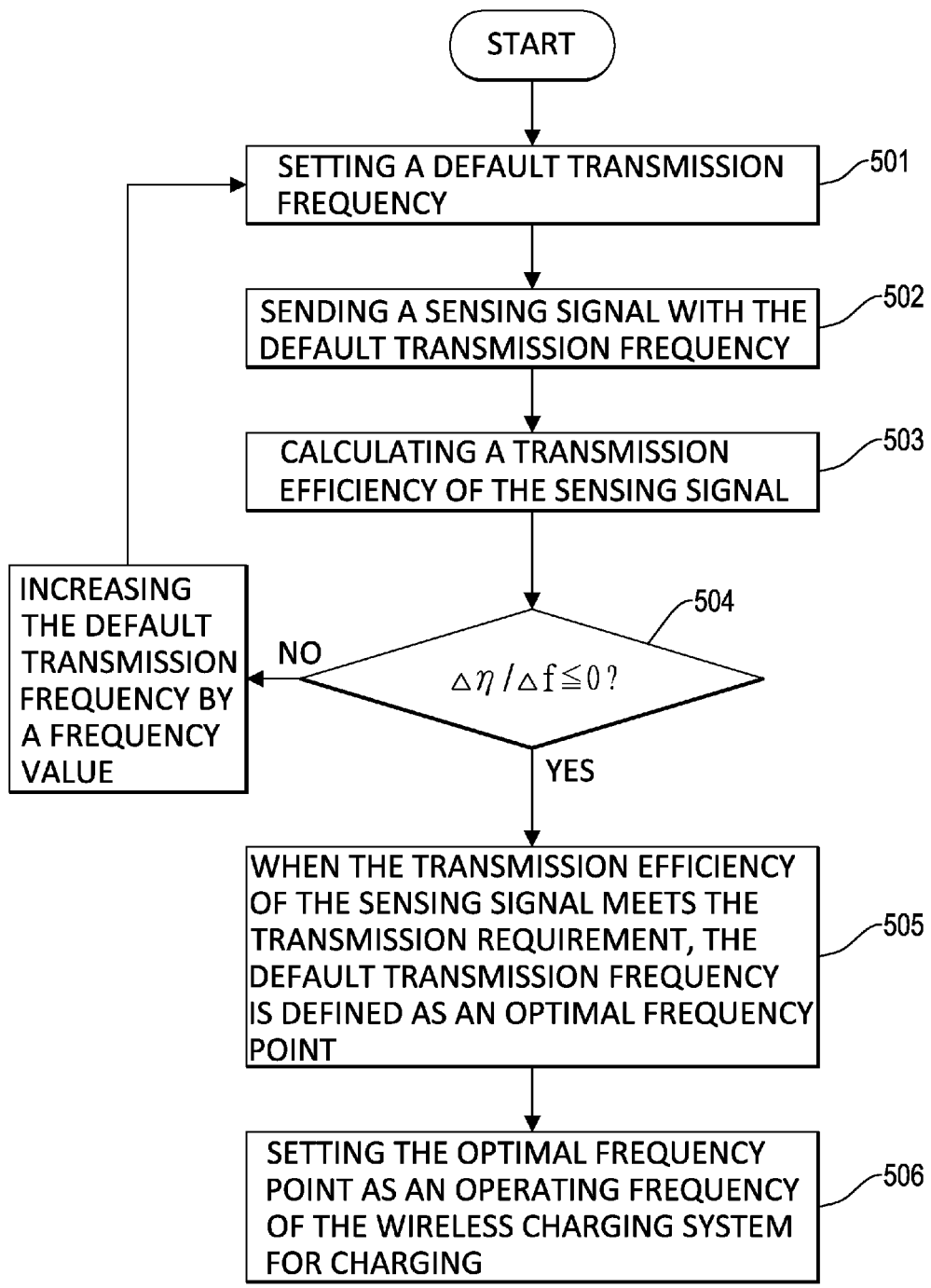
FIG. 5 is a flow chart of a tracing process for an optimal frequency point of the high efficiency wireless charging system in FIG. 1.

With reference to FIG. 5, after keeping the resonant frequency points of the high efficiency wireless system in a proper operating frequency range, the first and the second controller 12, 22 respectively execute the tracing process for the optimal frequency point having following steps.

Setting a default transmission frequency (501).

Sending a sensing signal with the default transmission frequency (502).

Calculating a transmission efficiency of the sensing signal (503).

Determining whether the transmission efficiency of the sensing signal meets a transmission requirement (504).

When the transmission efficiency of the sensing signal does not meet the transmission requirement, repeat the previous steps (501) to (504) with another default transmission frequency.

When the transmission efficiency of the sensing signal meets the transmission requirement, the default transmission frequency is defined as an optimal frequency point (505).

Setting the optimal frequency point as an operating frequency of the wireless charging system for charging (506).

In the steps (504) and (505), a method for determining whether the transmission efficiency of the sensing signal meets the transmission requirement is to determine whether a ratio of an efficiency variation $\Delta\eta$ frequency variation $\Delta f$ of the sensing signal is less than or equal to 0 (504). When the ratio of the efficiency variation $\Delta\eta$ to the frequency variation $\Delta f$ of the sensing signal is greater than 0, resets the default transmission frequency by increasing a frequency value (such as 0.5 KHz) (501), and then repeats the steps (502) to (504). When the ratio of the efficiency variation $\Delta\eta$ to the frequency variation $\Delta f$ of the sensing signal is less than or equal to 0, the default transmission frequency is defined as the optimal frequency point (505).

Figure 6:
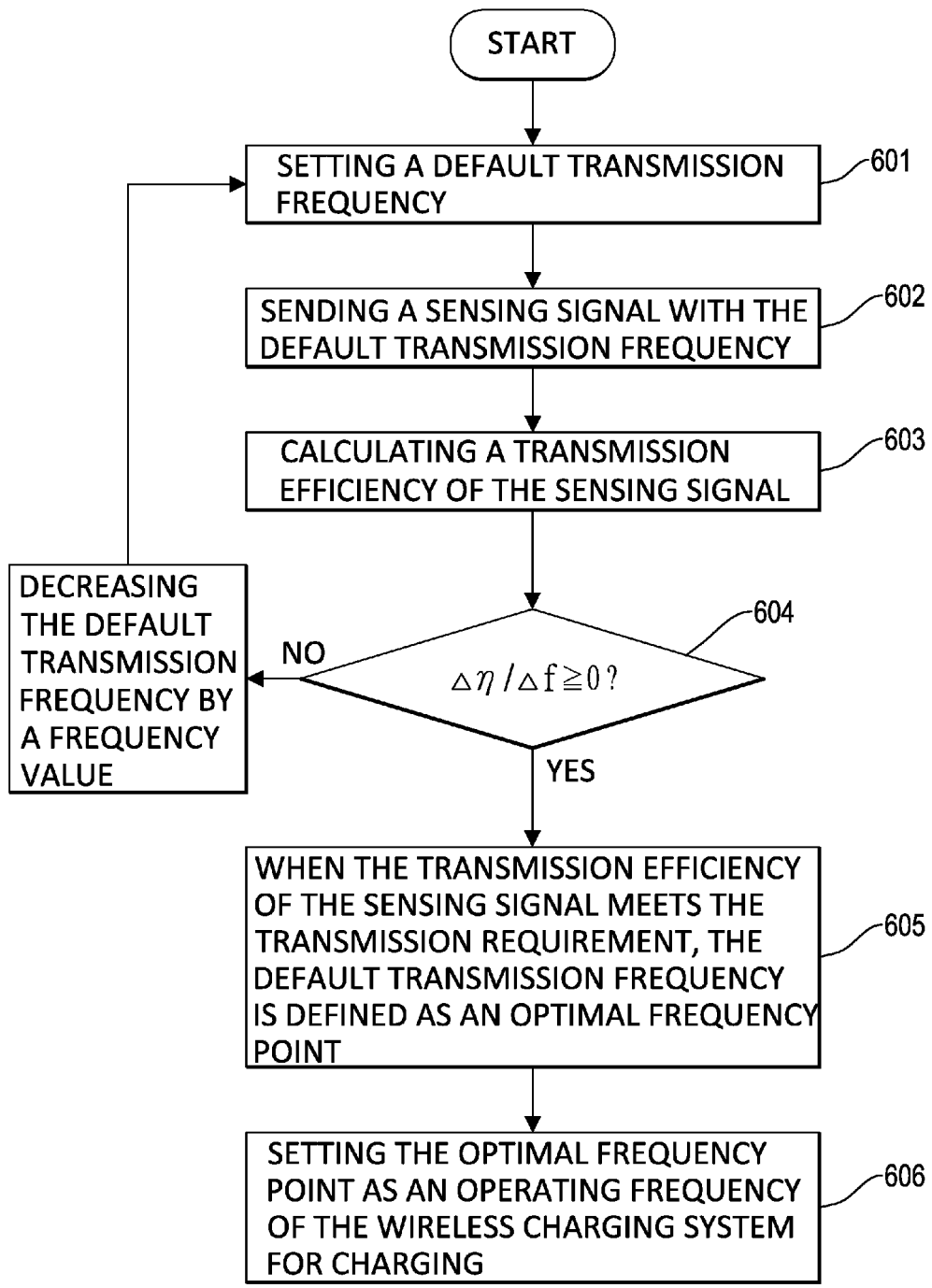
FIG. 6 is a flow chart of another tracing process for the optimal frequency point of the high efficiency wireless charging system in FIG. 1.

The previous tracing process for the optimal frequency point sets the default transmission frequencies from a low frequency to a high frequency. In other words, another tracing process for the optimal frequency point sets the default transmission frequencies from a high frequency to a low frequency can also be adapted for the high efficiency wireless charging system. With reference to FIG. 6, the tracing process for the optimal frequency point comprises following steps.

Setting a default transmission frequency (601).

Sending a sensing signal with the default transmission frequency (602).

Calculating a transmission efficiency of the sensing signal (603).

Determining whether the transmission efficiency of the sensing signal meets a transmission requirement (604).

When the transmission efficiency of the sensing signal does not meet the transmission requirement, repeats the previous steps (601) to (604) with another default transmission frequency.

When the transmission efficiency of the sensing signal meets the transmission requirement, the default transmission frequency is defined as an optimal frequency point (605).

Setting the optimal frequency point as an operating frequency of the wireless charging system for charging (606).

With reference to FIGS. 5 and 6, the steps (501) to (506) and the steps (601) to (606) of the two tracing process for the optimal frequency pointes are almost the same, the difference between the two tracing process for the optimal frequency pointes are steps (601) and (604). The first default transmission frequency setting in the step (601) is higher than the first default transmission frequency setting in the step (501). In the step (604) and (605), a method for determining whether the transmission efficiency of the sensing signal meets the transmission requirement is to determine whether a ratio of an efficiency variation $\Delta\eta$ to a frequency variation $\Delta f$ of the sensing signal is greater than or equal to 0 (604). When the ratio of the efficiency variation $\Delta\eta$ to the frequency variation $\Delta f$ of the sensing signal is less than 0, resetting the default transmission frequency by decreasing a frequency value (such as 0.5 KHz), and then repeats the steps (602) to (604). When the ratio of the efficiency variation $\Delta\eta$ to the frequency variation $\Delta f$ of the sensing signal is greater than or equal to 0, the default transmission frequency is defined as the optimal frequency point (605).

By the impedance matching method and the tracing process for the optimal frequency pointes, the first preferred embodiment of the high efficiency wireless charging system in accordance with the present invention performs impedance matching and keeps the optimal frequency points as the operating frequency of the high efficiency wireless charging system.

Figure 7:
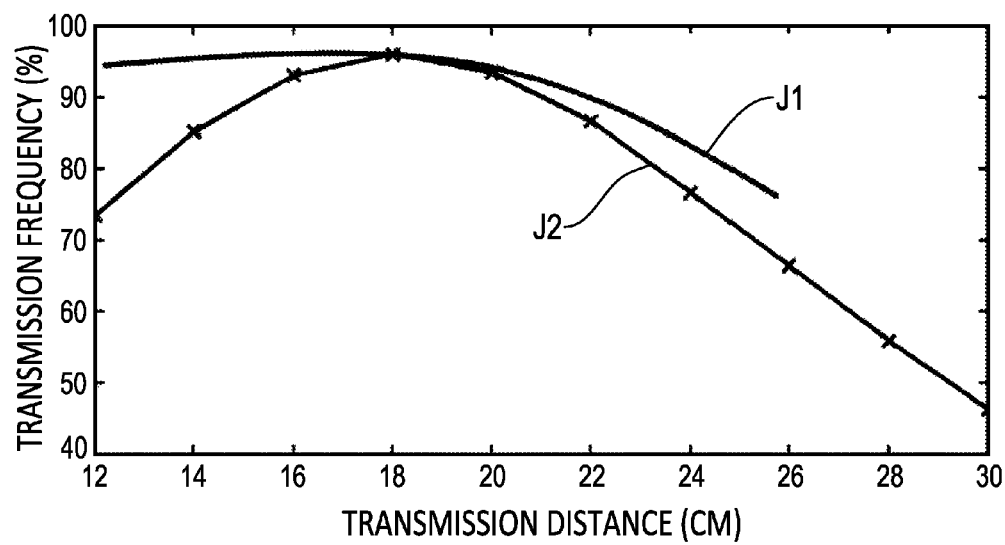
FIG. 7 is a characteristic curve of the high efficiency wireless charging system in FIG. 1.
Figure 8:
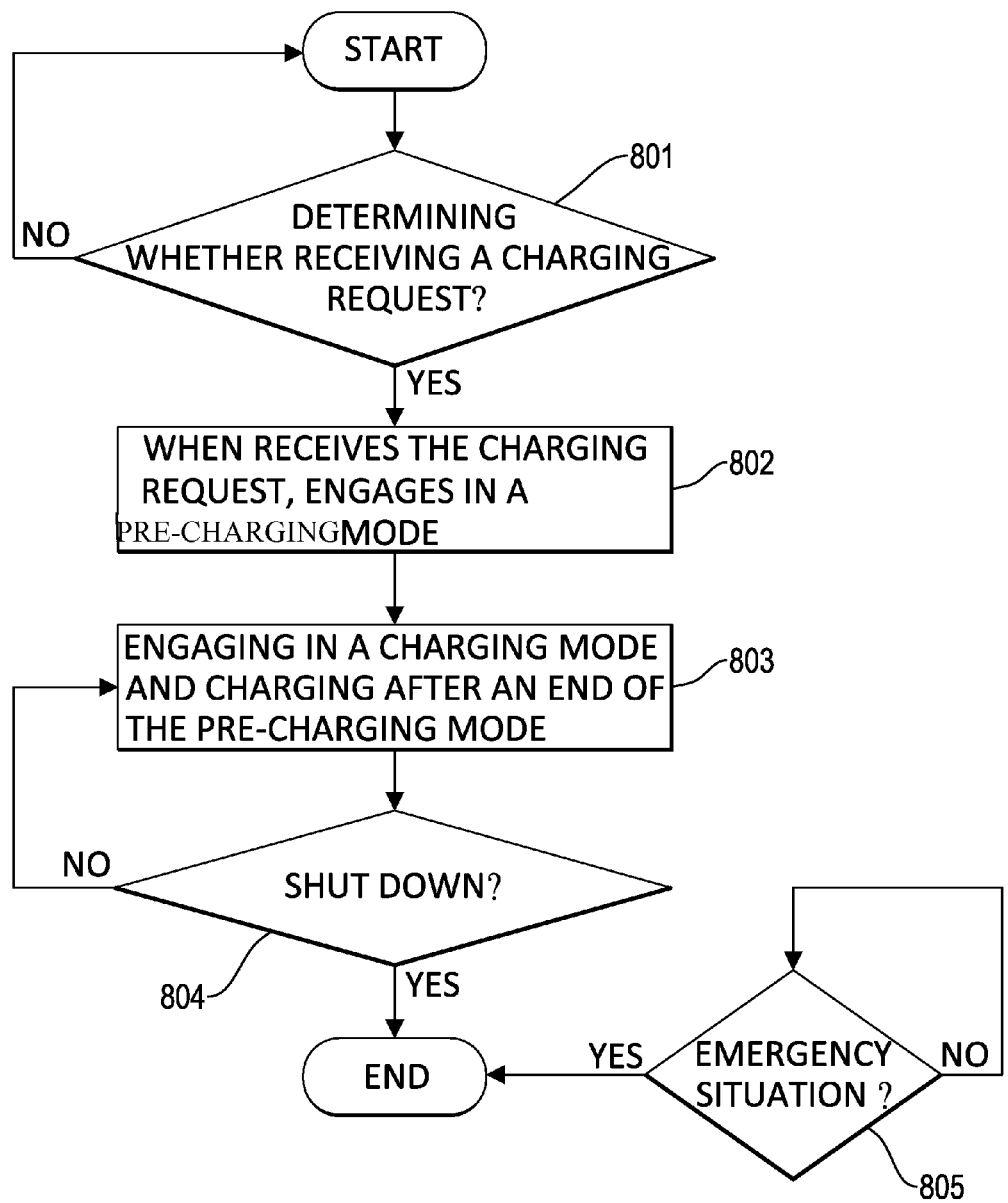
FIG. 8 is a flow chart of a charging process of the high efficiency wireless charging system in FIG. 1.

Furthermore, the optimal frequency point defined by the high efficiency wireless charging system can maintain high efficiency of the wireless charging system against the variable transmitting distances. With reference to FIG. 7, a vertical axis FIG. 7 indicates transmission efficiency, and a horizontal axis FIG. 7 indicates transmission distance. The transmission efficiency of the high efficiency wireless charging system in accordance with the present invention has high transmission efficiencies at multiple transmission distances (such as 12, 14, 16, 18 cm) (curve J1).Even the transmission efficiency of the high efficiency wireless charging system decreases with the transmission distance increases, the transmission efficiency of the high efficiency wireless charging system is still higher than a transmission efficiency of a conventional wireless charging system at a same transmission distance (curve J2).

When the high efficiency wireless charging system in accordance with the present invention is in use, a charging process of the high efficiency wireless charging system has the following steps.

Determining whether receiving a charging request (801).

When receives the charging request, engages in a pre-charging mode (802).

Engaging in a charging mode and charging after an end of the pre-charging mode (803).

Determining whether a shut down (804) or an emergency situation (805) appears.

When any one of a shut down (804) or an emergency situation (805) appears, terminates the charging process (806).

In the step (802), the impedance matching method and the tracing process for the optimal frequency point are both executed.

Figure 9:
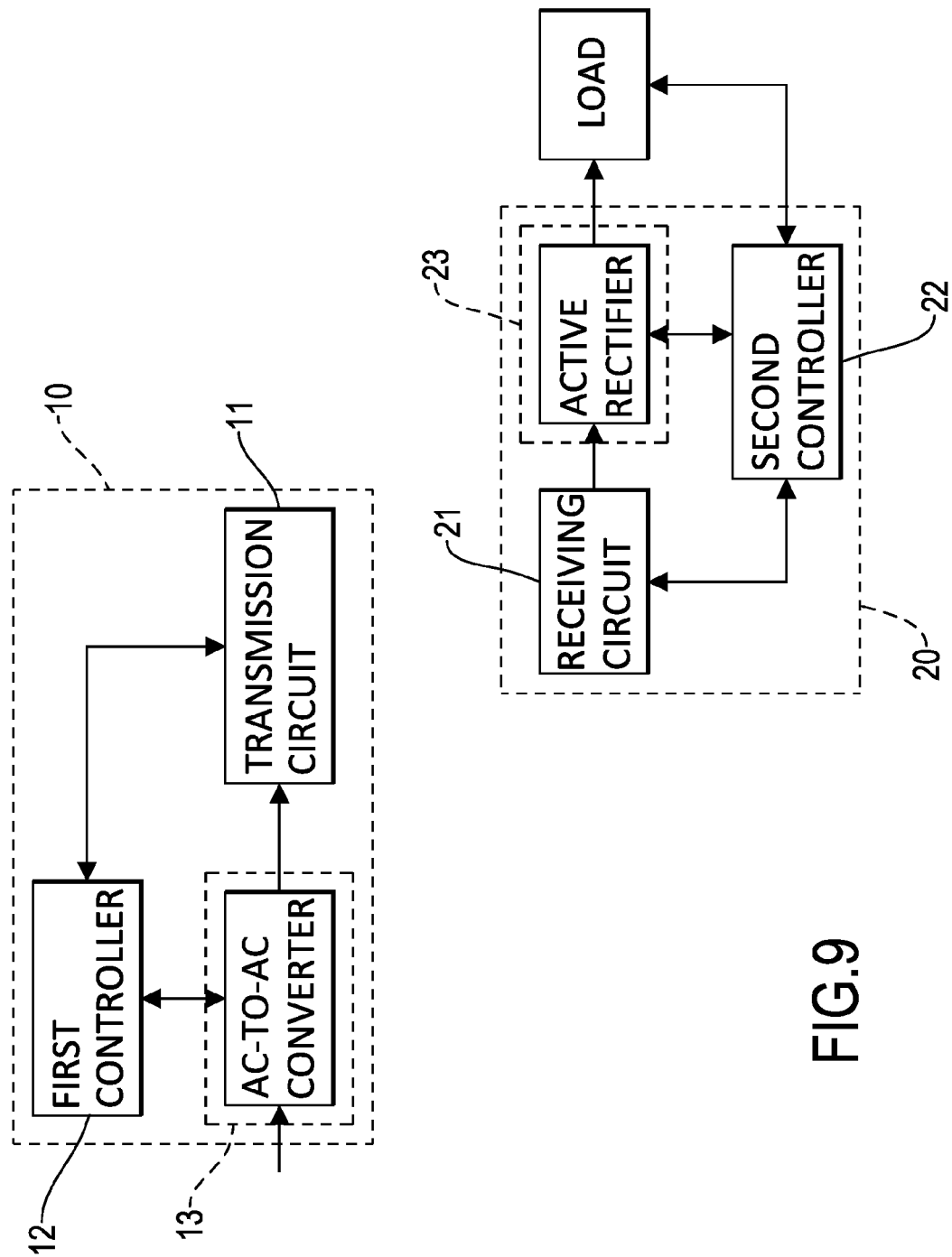
FIG. 9 is a block diagram of a second preferred embodiment of a high efficiency wireless charging system in accordance with the present invention.
Figure 10:
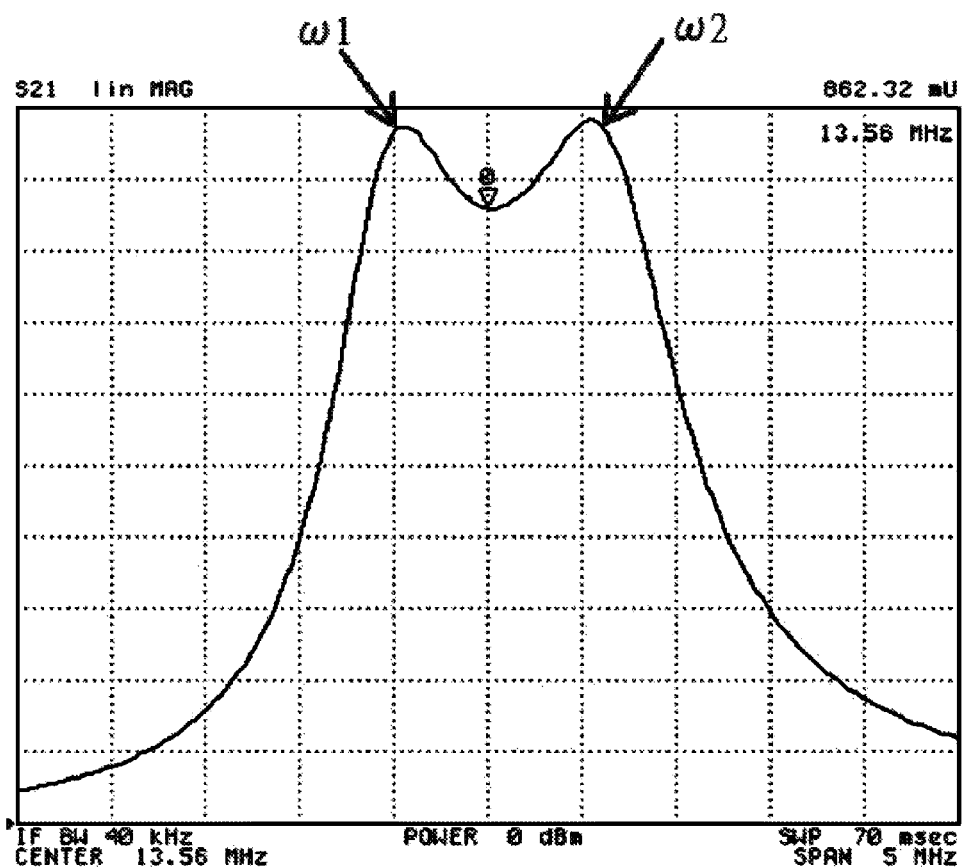
FIG. 10 is a characteristic curve of a conventional wireless charger.
Figure 11:
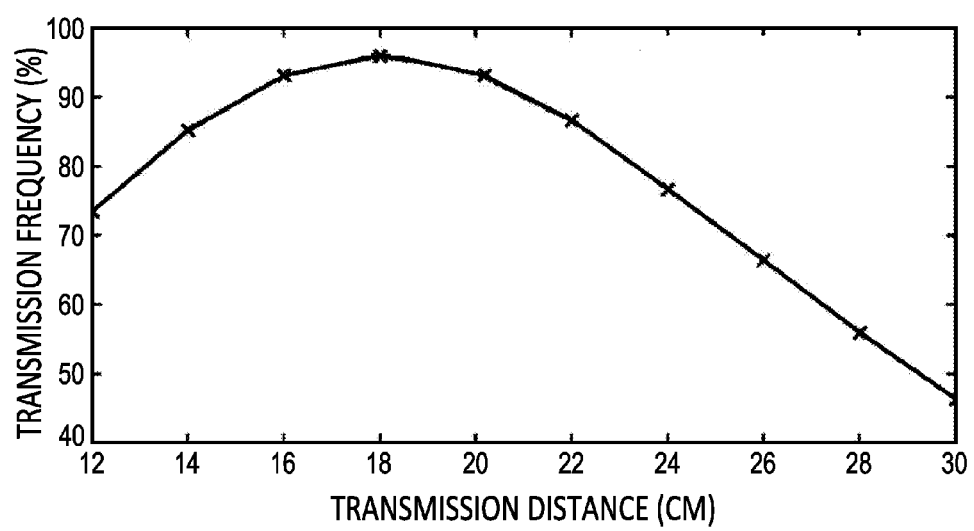
FIG. 11 is another characteristic curve of the wireless charger in FIG. 10.
Figure 12:
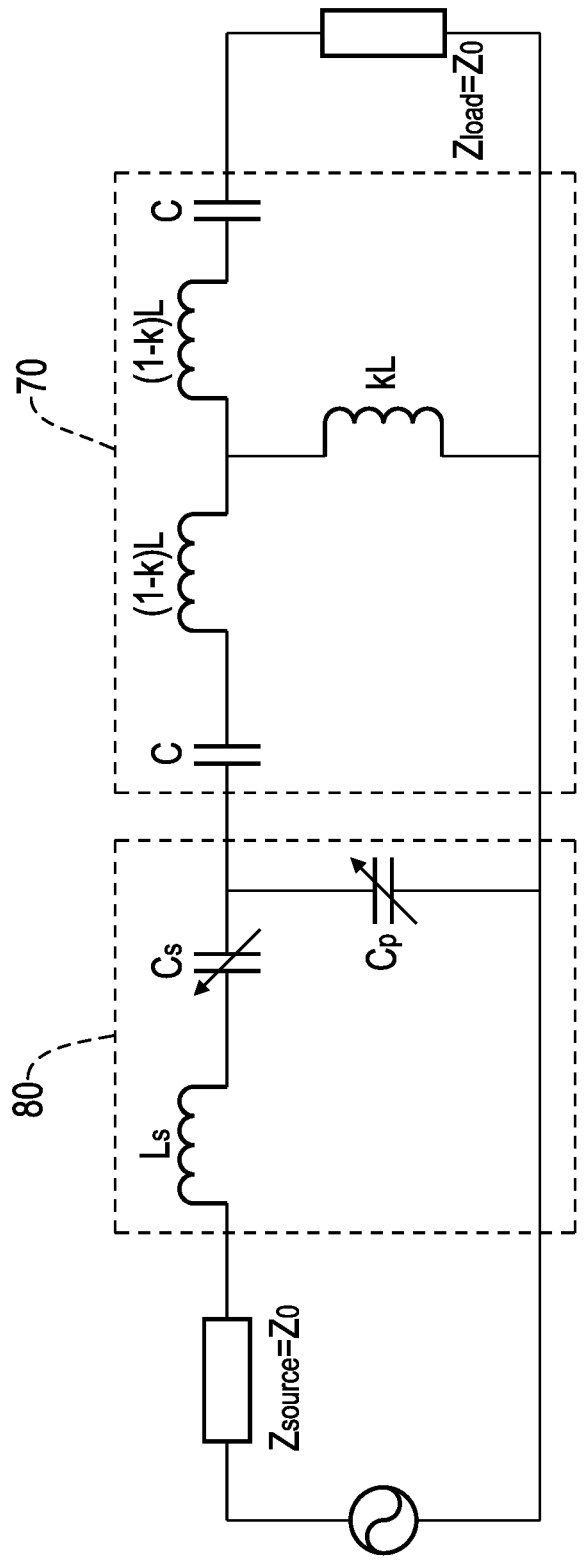
FIG. 12 is a circuit diagram of an impedance matching circuit adapted for a conventional wireless charger.

Furthermore, the first preferred embodiment of the wireless transmitter 10 of the high efficiency wireless charging system in accordance with the present invention is the nature of the AC-to-DC-to-AC. In fact, the high efficiency wireless charging system in accordance with the present invention can also be the nature of the AC-to-AC. With reference to FIG. 9, a structure of a second preferred embodiment and the structure of the first preferred embodiment of the high efficiency wireless charging system in accordance with the present invention are almost the same, differences between the first and the second preferred embodiment are the first and the second power conversion modules 13, 23.

In the second preferred embodiment, the first conversion module 13 is an AC-to-AC converter having an input terminal and an output terminal, wherein the input terminal and the output terminal of the first conversion module 13 are respectively connected to an AC power and an input terminal of the transmission circuit 11.

The second conversion module 23 is an active rectifier, thus, a wireless transmitter 10 and a wireless receiver 20 of the second preferred embodiment forms an AC-to-AC transmission system and decreases a power conversion loss, and further increases transmission efficiency of the second preferred embodiment of the high efficiency wireless charging system in accordance with the present invention.

Even though numerous characteristics and advantages of the present invention have been set forth in the foregoing description, together with details of the structure and features of the invention, the disclosure is illustrative only. Changes may be made in the details, especially in matters of shape, size, and arrangement of parts within the principles of the invention to the full extent indicated by the broad general meaning of the terms in which the appended claims are expressed.

What is claimed is:

1. A control method for a high efficiency wireless charging system, comprising the steps of:
keeping a resonant frequency point of a wireless charging system in an operating frequency range of the wireless charging system by performing impedance matching on an antenna of the wireless charging system;
tracing an optimal frequency point by sending a sensing signal with a default transmission frequency, and calculating a transmission efficiency of the sensing signal;
determining whether the transmission efficiency meets a transmission requirement; when the transmission efficiency does not meet the transmission requirement, repeats the previous steps with another default transmission frequency until the transmission efficiency meeting the transmission requirement;

when the transmission efficiency meeting the transmission requirement, the default transmission frequency is defined as the optimal frequency point;
setting the optimal frequency point as an operating frequency of the wireless charging system for charging;
wherein the step of tracing the optimal frequency point is to determine whether the transmission efficiency meets the transmission requirement comprises steps of:
determining whether a ratio of an efficiency variation to a frequency variation of the sensing signal is less than or equal to 0, when the ratio of the efficiency variation to the frequency variation of the sensing signal is greater than 0, the sensing signal is resent with the default transmission frequency by increasing a frequency value, and then recalculates the transmission efficiency of the sensing signal;
when the ratio of the efficiency variation to the frequency variation of the sensing signal is less than or equal to 0, the default transmission frequency is defined as the optimal frequency point.

2. The control method as claimed in claim 1, wherein the step of performing impedance matching on the antenna of the wireless charging system comprises steps of:
sending a testing signal;
calculating a transmission efficiency of the testing signal;
determining a tuned value of a capacitance for impedance matching;
tuning the capacitance with the tuned value for impedance matching.

3. The control method as claimed in claim 2, wherein the capacitance for impedance matching is based on a comparison table of transmission efficiency to transmission distance.

4. The control method as claimed in claim 1, wherein the step of tracing the optimal frequency point to determine whether the transmission efficiency meets the transmission requirement comprises steps of:
determining whether a ratio of an efficiency variation to a frequency variation of the sensing signal is greater than or equal to 0, when the ratio of the efficiency variation to the frequency variation of the sensing signal is less than 0, the sensing signal is resent with the default transmission frequency by decreasing a frequency value, and then recalculates the transmission efficiency of the sensing signal;
when the ratio of the efficiency variation to the frequency variation of the sensing signal is greater than or equal to 0, the default transmission frequency is defined as the optimal frequency point.

5. The control method as claimed in claim 2, wherein the step of tracing the optimal frequency point to determine whether the transmission efficiency meets the transmission requirement comprises steps of:
determining whether a ratio of an efficiency variation to a frequency variation of the sensing signal is greater than or equal to 0, when the ratio of the efficiency variation to the frequency variation of the sensing signal is less than 0, the sensing signal is resent with the default transmission frequency by decreasing a frequency value, and then recalculates the transmission efficiency of the sensing signal;
when the ratio of the efficiency variation to the frequency variation of the sensing signal is greater than or equal to 0, the default transmission frequency is defined as the optimal frequency point.

6. The control method as claimed in claim 3, wherein the step of tracing the optimal frequency point to determine whether the transmission efficiency meets the transmission requirement comprises steps of:
determining whether a ratio of an efficiency variation to a frequency variation of the sensing signal is greater than or equal to0, when the ratio of the efficiency variation to the frequency variation of the sensing signal is less than 0, the sensing signal is resent with the default transmission frequency by decreasing a frequency value, and then recalculates the transmission efficiency of the sensing signal;
when the ratio of the efficiency variation to the frequency variation of the sensing signal is greater than or equal to 0, the default transmission frequency is defined as the optimal frequency point.

7. A high efficiency wireless charging system comprising:
a wireless transmitter having
a first controller; and
a transmission circuit electrically connected to the first controller and having
a first impedance matching unit having variable capacitance, wherein the capacitance of the first impedance matching unit is controlled by the first controller; and
a transmission unit electrically connected to the first impedance matching unit;
wherein after the first controller controls the capacitance of the first impedance matching unit, the first controller further executes a tracing process for an optimal frequency point; and
a wireless receiver having
a second controller; and
a receiving circuit electrically connected to the second controller and having
a second impedance matching unit having variable capacitance, wherein the capacitance of the second impedance matching unit is controlled by the second controller; and
a receiving unit electrically connected to the second impedance matching unit;
wherein after the second controller controls the capacitance of the second impedance matching unit, the second controller further executes the tracing process for the optimal frequency point;
wherein the tracing process for the optimal frequency point comprises steps of:
sending a sensing signal with a default transmission frequency and calculating a transmission efficiency of the sensing signal;
determining whether the transmission efficiency of the sensing signal meets a transmission requirement, when the transmission efficiency of the sensing signal does not meet the transmission requirement, repeat the previous steps with another default transmission frequency;
when the transmission efficiency of the sensing signal meets the transmission requirement, the default transmission frequency is defined as an optimal frequency point.

8. The high efficiency wireless charging system as claimed in claim 7, wherein the transmission unit comprises
a first fixed capacitor;
an first induction coil; and
a first resistor;
wherein the first fixed capacitor, the first induction coil and the first resistor are electrically connected to form a first circuit loop, and the first impedance matching unit is electrically connected to the first circuit loop of the transmission unit;
the receiving unit comprises
a second fixed capacitor;

an second induction coil; and a second resistor;

wherein the second fixed capacitor, the second induction coil and the second resistor of the receiving unit are electrically connected to form a second circuit loop, and the second impedance matching unit is electrically connected to the second circuit loop of the receiving unit.

9. The high efficiency wireless charging system as claimed in claim 8, wherein the first impedance matching unit is a variable capacitor able to modulate continuously;

the second impedance matching unit is a variable capacitor able to modulate continuously.

10. The high efficiency wireless charging system as claimed in claim 8, wherein the first impedance matching unit comprises multiple first regulated capacitors in parallel; and multiple first circuit switch, wherein each first circuit switch is connected in series with a corresponding one of the multiple first regulated capacitors, and a conduction of each first circuit switch is controlled by the first controller;

the second impedance matching unit comprises multiple second regulated capacitors in parallel; and multiple second circuit switch, wherein each second circuit switch is connected in series with a corresponding one of the multiple second regulated capacitors, and a conduction of each second circuit switch is controlled by the second controller.

11. The high efficiency wireless charging system as claimed in claim 8, wherein the wireless transmitter further has a first power conversion module electrically connected to the transmission circuit;

the wireless receiver further has a second power conversion module electrically connected to the receiving circuit.

12. The high efficiency wireless charging system as claimed in claim 11, wherein the first power conversion module comprises an AC-to-DC converter having an input terminal and an output terminal; and an amplifier having an input terminal and an output terminal, wherein the input terminal and the output terminal of the amplifier are electrically connected to the output terminal of the AC-to-DC converter and the transmission circuit respectively;

the second power conversion module comprises a rectifier having an input terminal and an output terminal, wherein the input terminal of the rectifier is electrically connected to the receiving circuit; and a DC-to-DC converter having an input terminal and an output terminal, wherein the input terminal of the DC-to-DC converter is electrically connected to the output terminal of the rectifier.

13. The high efficiency wireless charging system as claimed in claim 11, wherein the first power conversion module is an AC-to-AC converter.

\* \* \* \* \*